United States Patent
Shamine et al.

(10) Patent No.: US 7,163,091 B2
(45) Date of Patent: Jan. 16, 2007

(54) ROTOR WITH LOCKING PINS

(75) Inventors: Dennis R. Shamine, Lorain, OH (US); John R. Schafner, Lorain, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 0 days.

(21) Appl. No.: 10/439,645

(22) Filed: May 16, 2003

(65) Prior Publication Data

US 2004/0226786 A1    Nov. 18, 2004

(51) Int. Cl.
*F16D 65/827*    (2006.01)

(52) U.S. Cl. .............................. 188/218 XL; 188/18 A

(58) Field of Classification Search ......... 188/218 XL, 188/18 A, 218 R, 206 R; 29/416, 888.09
See application file for complete search history.

(56) References Cited

U.S. PATENT DOCUMENTS

| | | | | |
|---|---|---|---|---|
| 5,158,511 A | * | 10/1992 | Mungo | 188/218 XL |
| 5,810,123 A | * | 9/1998 | Giorgetti et al. | 188/218 XL |
| 5,864,935 A | | 2/1999 | Baumgartner et al. | |
| 6,267,210 B1 | * | 7/2001 | Burgoon et al. | 188/218 XL |
| 6,357,561 B1 | * | 3/2002 | Ruiz | 188/218 XL |
| 6,446,765 B1 | * | 9/2002 | Dabertrand et al. | 188/18 A |
| 6,450,303 B1 | * | 9/2002 | Keck et al. | 188/218 XL |
| 6,457,567 B1 | * | 10/2002 | Bunker | 188/18 A |
| 6,467,588 B1 | * | 10/2002 | Baumgartner et al. | 188/218 XL |
| 6,564,913 B1 | * | 5/2003 | Baumgartner et al. | 188/218 XL |

FOREIGN PATENT DOCUMENTS

DE    1775685 B    *    7/1975

* cited by examiner

*Primary Examiner*—Melanie Torres
(74) *Attorney, Agent, or Firm*—Calfee, Halter & Griswold LLP

(57) ABSTRACT

A rotor having a disc and a hub assembly, in which the disc may be easily removed from the hub. The assembly has driving pins to connect the disc with the hub. The driving pins take up the tolerance between the disc and hub connection and absorb the torque applied to the rotor, preventing stress and therefore fatigue on the disc and hub.

14 Claims, 9 Drawing Sheets

ROTOR WITH LOCKING PINS

FIELD OF THE INVENTION

The present invention relates generally to a rotor and more particularly to a two-piece rotor with characteristics that make the rotor more convenient and efficient to replace.

BACKGROUND OF THE INVENTION

A braking system is the most important system in a vehicle. The braking system can exert thousands of pounds of pressure on the brakes. In the braking system are disc brakes. The disc brakes use a clamping action to produce friction between a rotor and brake pads mounted in a caliper attached to a suspension member. The vehicle slows down due to the friction between the pads and the rotor.

A rotor is a round metal disc which rotates with a wheel of a vehicle and, in order to generate braking power, force is applied to the rotor from the brake pads. The friction force against the rotor stops the wheel from spinning and, therefore, stops the vehicle. Conventionally, a brake disc is one combined piece and very laborious to replace.

In today's commercial vehicle market, there are many problems with rotors having a short life span that wear out regularly due to the tremendous amount of force applied to the rotor when the vehicle is braking, especially the amount of force a commercial vehicle applies on the rotor. Therefore, the rotor needs to be replaced frequently.

Conventionally, a rotor is a one-piece design for a more simple and inexpensive method of manufacturing. However, replacing a rotor, which becomes necessary after the contact surfaces exhibit too much wear from the pads, includes complete disassembly of the wheel hub and disc brake assembly. The rotor for a commercial truck is extremely heavy and usually takes more than one person or machine to remove and replace, which is very time consuming and inefficient.

In U.S. Pat. No. 5,864,935, a two piece rotor is disclosed in order to conveniently replace the brake disc after wear on to a wheel hub. However, this design creates multiple pieces and requires multiple fasteners, which in turn requires more assembly and disassembly steps. The prior art rotor also requires that the entire rotor be removed from the wheel hub to replace the disc.

Accordingly, it is beneficial to have a rotor that will be replaced less frequently, in a more simplified manner, with less assembly and disassembly without removing the wheel hub, and with less parts.

SUMMARY OF THE INVENTION

The present invention is directed to a rotor for a vehicle brake system having a disc with an outside and an inside perimeter. The rotor also includes a hub which is a separate piece from the disc and connected to the disc.

Further, the present invention contemplates a method of assembling a rotor on to a wheel hub of a vehicle. The first step of the assembling method is connecting a hub to a wheel hub of a vehicle. The second step is connecting a disc to the hub. A further step is inserting drive mechanisms into the connected hub and disc for minimizing the tolerance between the hub and the disc and for absorbing the torque placed on the rotor.

DETAILED DESCRIPTION OF THE INVENTION

As will be described, the preferred embodiment of the present invention overcomes the problem created by the present day necessity of replacing a worn out rotor on a disc brake system by providing a two-piece rotor design with features including a separate disc, a separate hub, and a retaining groove and pin holes for locking the two-pieces together.

In addition, the present invention overcomes the problem of a rotor in a disc brake system overheating and creating fractures through-out the rotor by providing cooling pockets. This feature reduces the likelihood that the rotor will reach an excessively high temperature therefore fracturing and weakening the braking system.

The present invention of a two piece rotor or splined rotor is designed to simplify replacement after wear or failure of the disc portion of the rotor. The rotor is secured from moving radially and axially to prevent a wheel from being unbalanced.

Figure 1:
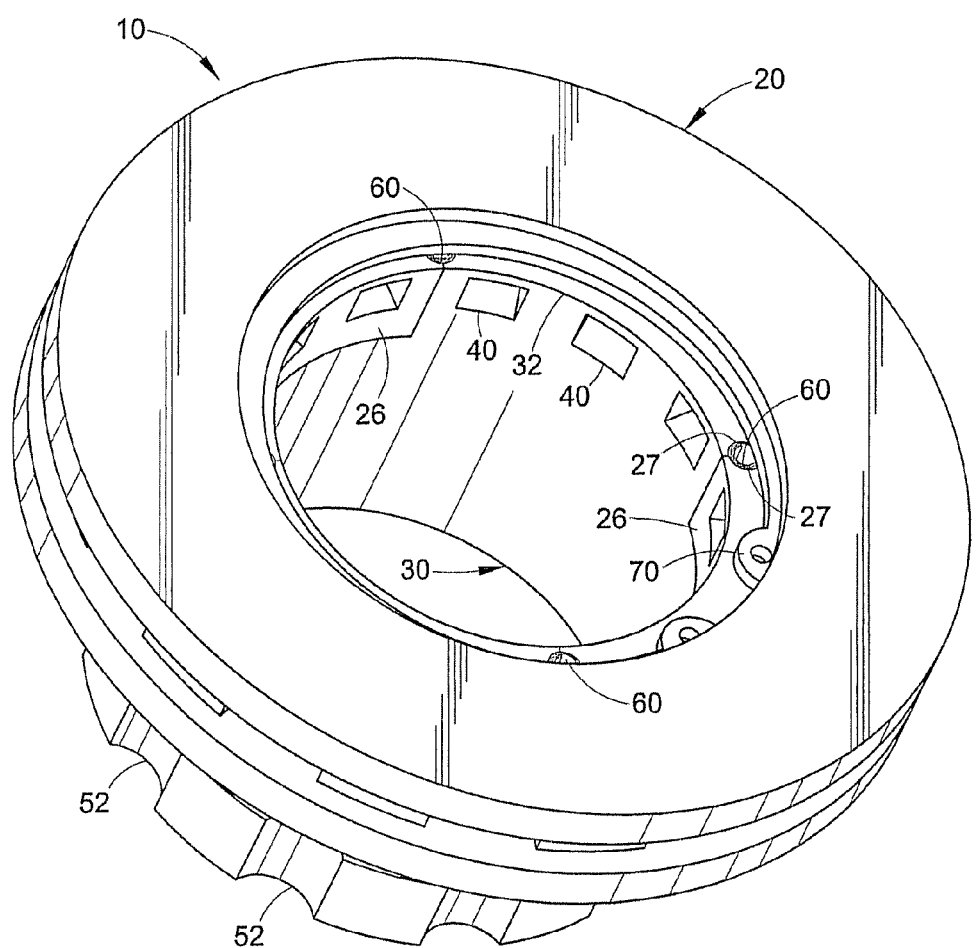
FIG. 1 shows a perspective front view of an assembled splined rotor.

The invention will now be described with reference to the drawings. As shown in FIG. 1, the invention is a two-piece rotor 10 with a disc portion 20 and a hub portion 30.

Figure 4A:
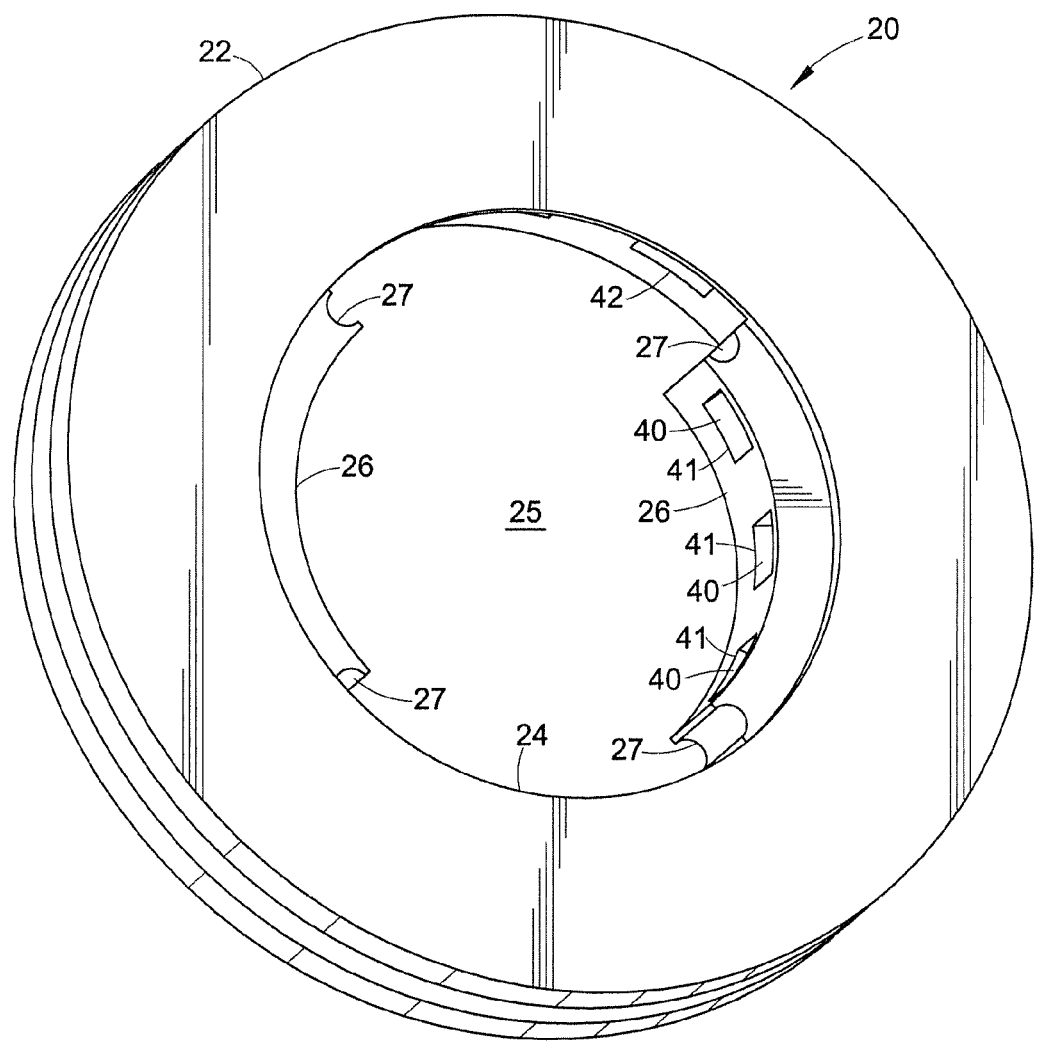
FIG. 4A shows a perspective view of a disc which is a part of the splined rotor.
Figure 4B:
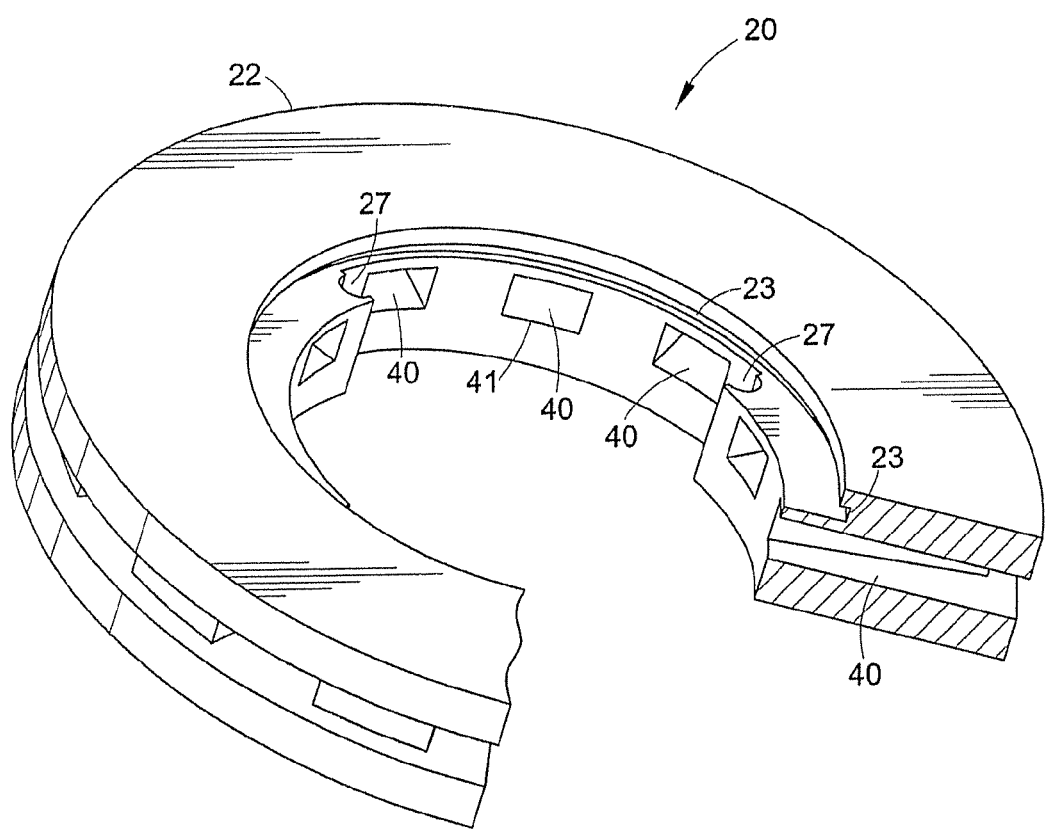
FIG. 4B shows a perspective cross-sectional view to illustrate the cooling passages for the disc.
Figure 9:
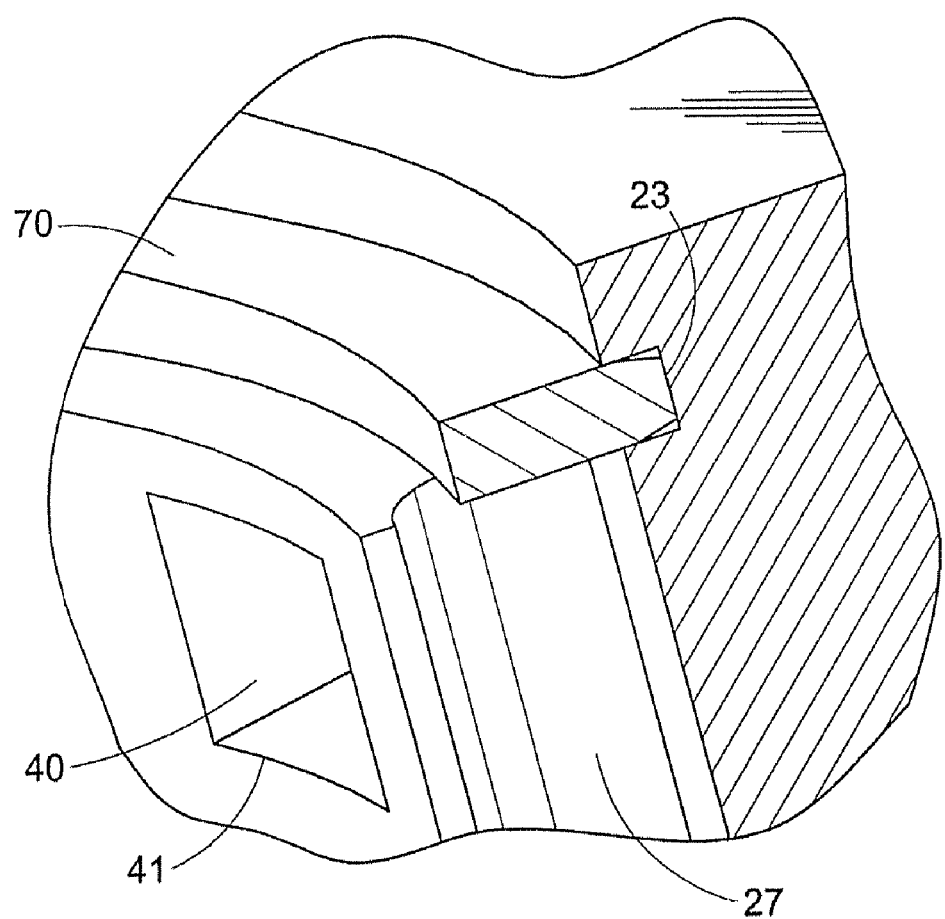
FIG. 9 is an enlarged view of the retaining ring and groove of FIG. 3.

As shown in FIGS. 4A and 4B, the disc 20 is ring-like with an outside perimeter 22 and an inside perimeter 24. The disc 20 has a beveled circumferential groove 23 around the inside perimeter, illustrated in FIG. 9. The inside perimeter 24 outlines an opening 25 at the center of the disc 20. Two opposing drive tangs 26 extend from the inside perimeter 24 into the opening 25 of disc 20.

At both ends of the drive tangs 26 is a semi-circular cavity 27. Openings or cooling pockets 40, preferably six, extend from the inside perimeter 24 to the outside perimeter 22 to allow air to flow through the disc 20. Exit openings 41 from the cooling pockets 40 are at the inside perimeter 24 where the drive tangs 26 are located. It is preferred to have three cooling pockets 40 within each drive tang 26. The pockets are sized for maximum cooling of the rotor to prevent the disc portion from getting heat line fractures in the face of the disc. The amount of material between the pockets is also a factor because this allows for proper filling and venting of the casting when being poured at the foundry. The pockets are a must to prevent the rotor from cracking.

The drive tangs 26 cover about half of the inside perimeter 24 of the disc 20. The other half of the inside perimeter 24 contains cooling slots 42 (similar to the cooling pockets 40) that extend from the inside perimeter 24 to the outside perimeter 22, to allow air to flow through the disc 20. Preferably half of the perimeters are used to allow for even distribution of the air flow thru the rotor to cool the rotor and prevent from cracking. If these pockets were to be eliminated the rotor would have hot spots and have cracking issues.

Figure 5:
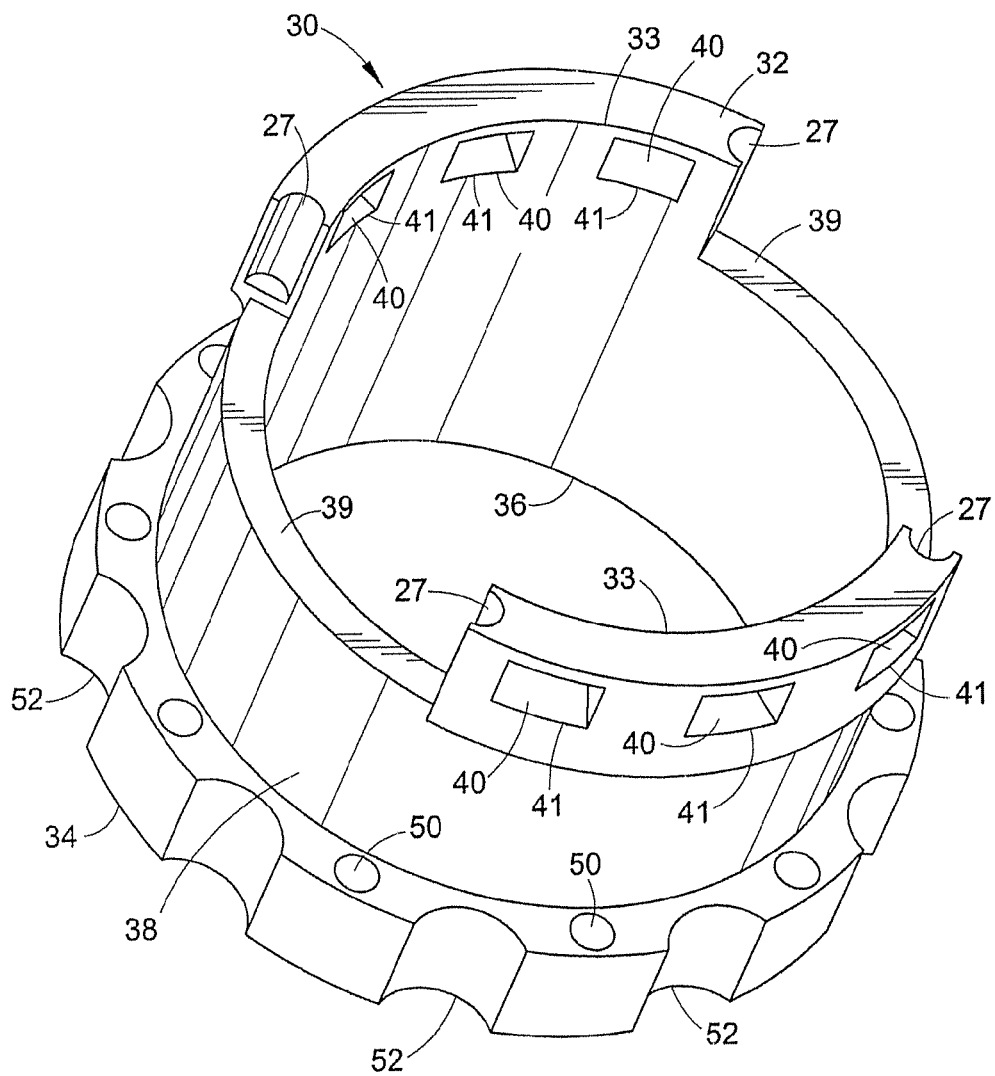
FIG. 5 shows a perspective view of a hub which is a part of the splined rotor.
Figure 6:
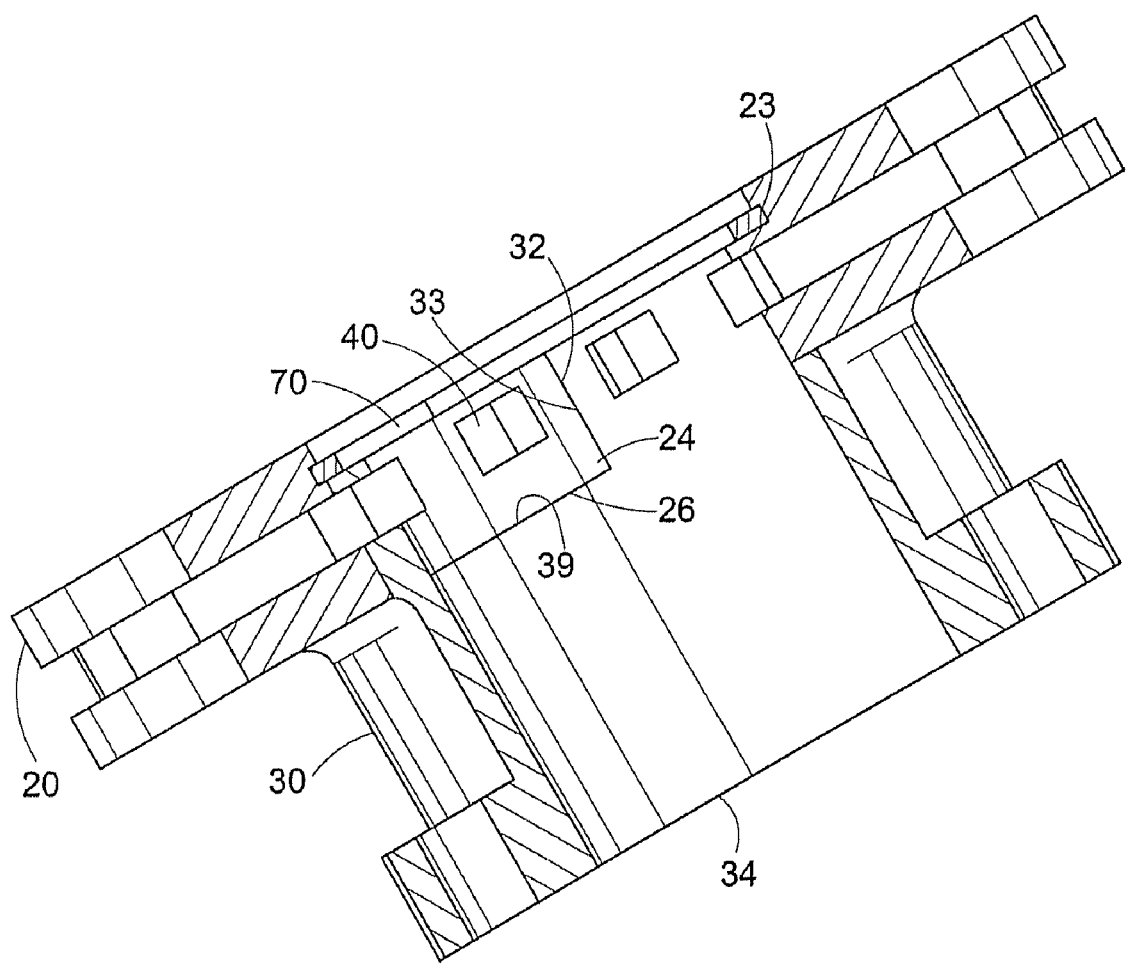
FIG. 6 shows a perspective cross-sectional view of the hub.

As shown in FIGS. 5 and 6, the hub 30 is generally cylindrical with a first end 32 and a second end 34. The first end 32 has two drive tangs 33 similar to the drive tangs of the disc 20. At the ends of each drive tang 33 is a semi-circular cavity 27. The drive tangs 33 include openings or cooling pockets 40 that extend from the inside perimeter 36 of the hub 30 to the outside perimeter 38 of the hub 30, similar to the cooling pockets 40 of the disc 20. The exit openings 41 of the cooling pockets 40 are at the inside perimeter 36 of the hub 30. The drive tangs 26 oppose each other on the first end 32 of the hub 30.

The drive tangs 33 of the hub 30 take up half of the first end 32. The other half of the first end 32 has two opposing ledges 39 located between the drive tangs 33 formed by the thickness of the hub 30.

The second end 34 of the hub 30 is flanged for connecting to a wheel hub (not shown). The flanged portion 34 extends around the entire outside perimeter 38 of the hub 30 and contains multiple holes 50 and a series of scallops or curved segments 52 for attachment to a wheel hub.

Figure 2:
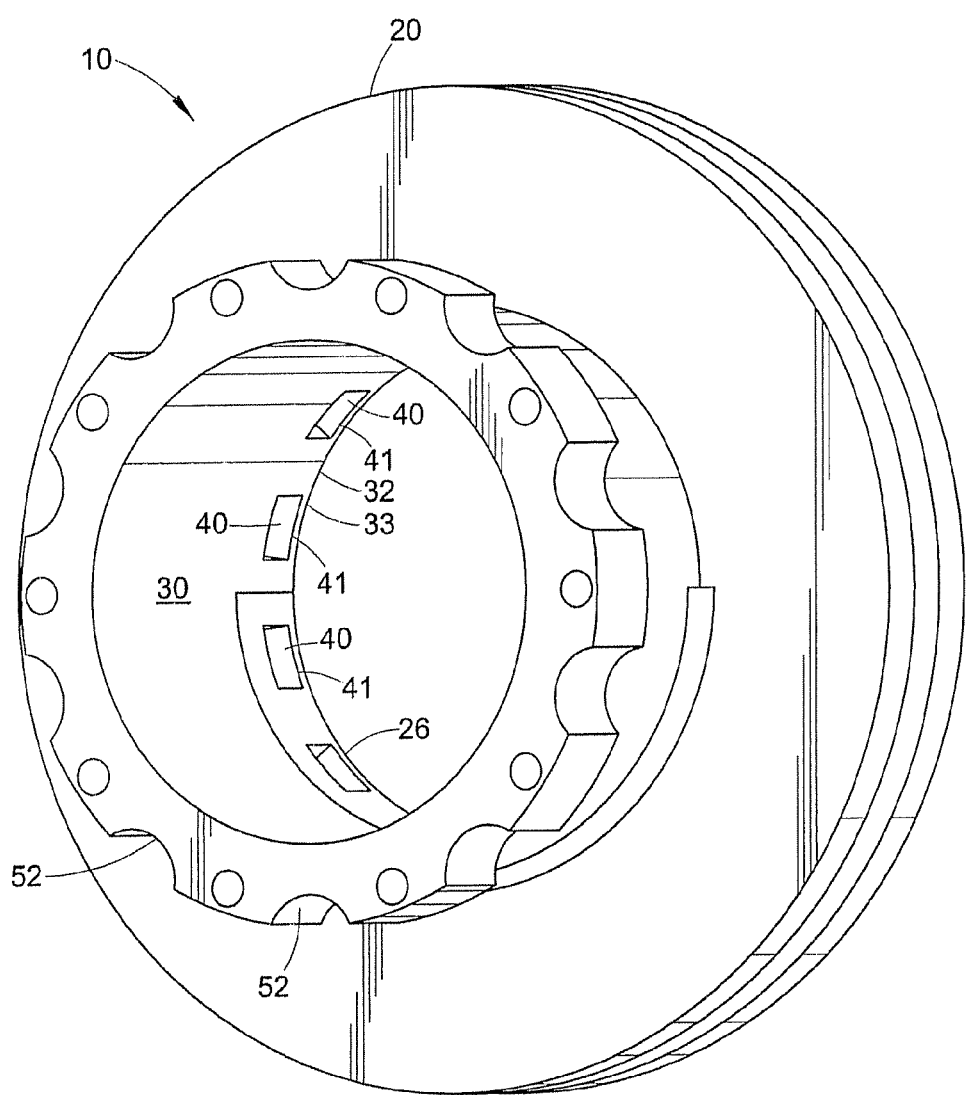
FIG. 2 shows a perspective back view of an assembled splined rotor.

As shown in FIGS. 1 and 2, the disc 20 and hub 30 are connected to each other to form the rotor 10. The disc 20 is attached to the hub 30 by the drive tangs 26 at the first end 32 of the hub 30. The drive tangs 26 of the disc 20 are placed on the ledges 39 of the hub 30 having the drive tangs 26 of the disc 20 and the drive tangs 33 of the hub 30 are side by side.

Figure 3:
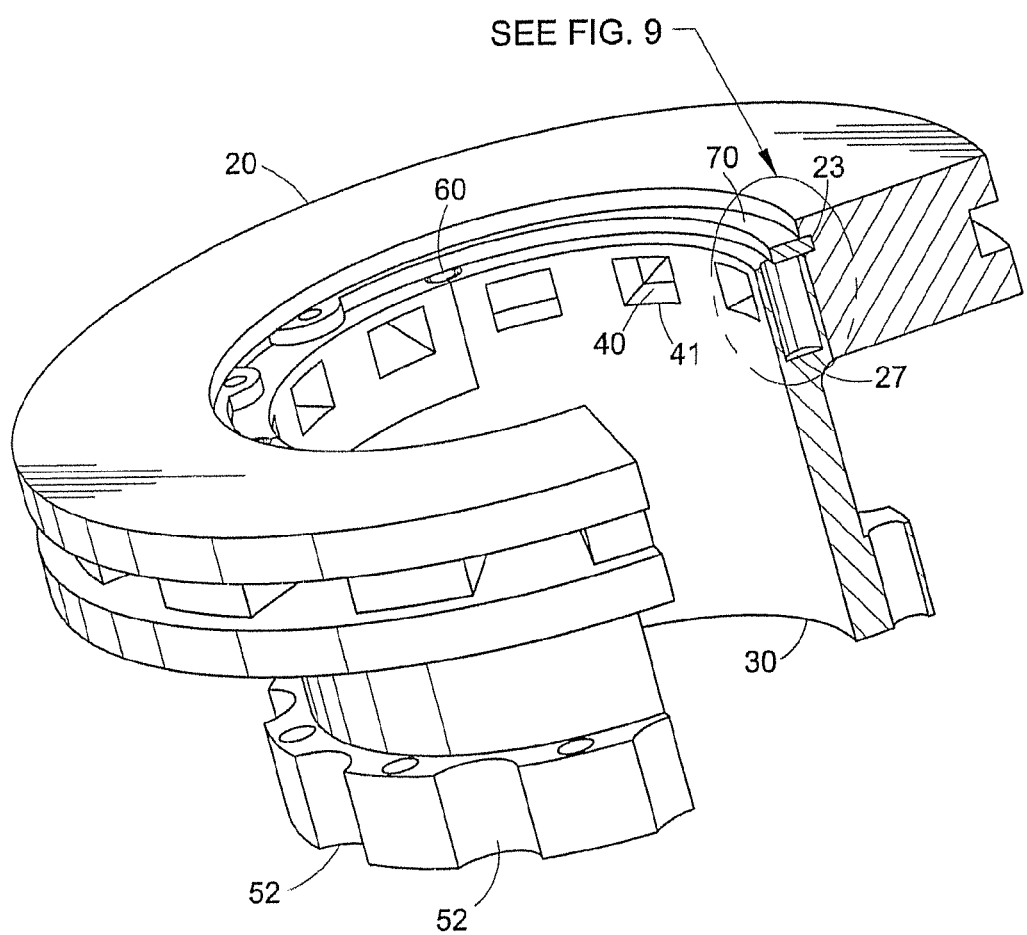
FIG. 3 shows a perspective cross-sectional view to illustrate the holes for driving pins.
Figure 8:
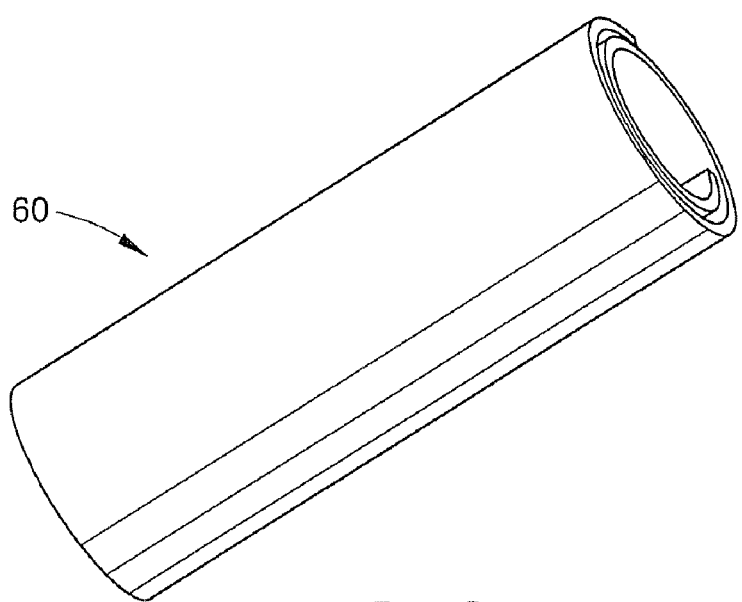
FIG. 8 shows a perspective view of a spiral drive pin.

As shown in FIG. 1, the semi-circular cavities 27 at the end of each drive tang 26, 33 are adjacent and form four circular cavities to house a drive mechanism, preferably a coiled spring pin 60 shown in FIG. 8. The coiled spring pin 60 is used as a radial clamp force to make the disc 20 and hub 30 integral and take up any tolerances or loose gaps, as shown in FIG. 3, between the two pieces. A solid drive pin may also be used only if the tolerances are maintained to take-up all clearances from the mating parts.

As shown in FIG. 8, the coiled spring pin 60 is wound around an axis and is able to be compressed and is able to flex after compression. For insertion into the adjacent semi-circular cavities 27, the coiled spring pin 60 is compressed before being inserted into the part. After insertion, the coiled spring pin 60 expands to form to the size of the part it is housed in and is able to tighten the connection of the disc 20 and the hub 30 by filling the loose gaps. When assembled, at least two of the cavities to house the drive mechanisms are used.

Figure 7:
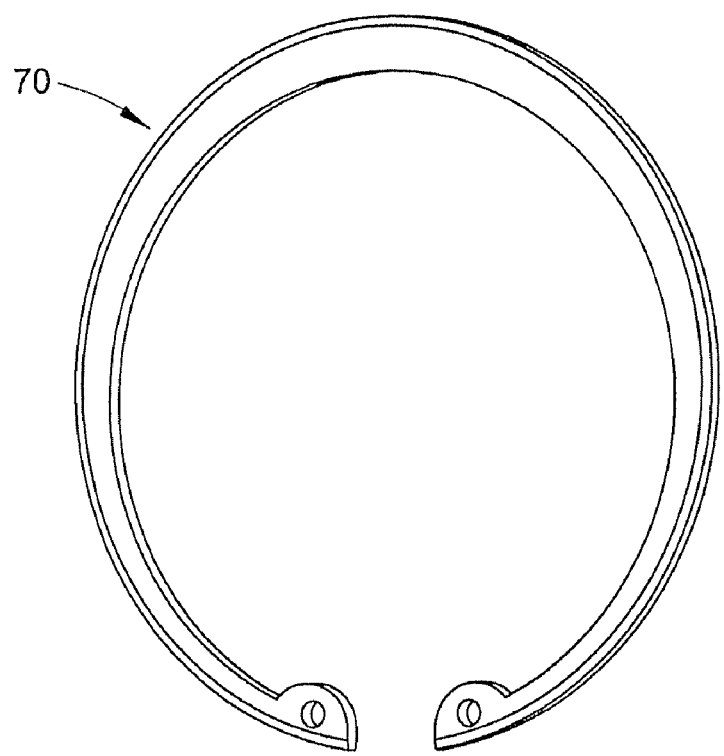
FIG. 7 shows a perspective view of a retaining ring.

A beveled retaining ring 70, as shown in FIG. 7, is used to take up axial tolerances between the disc 20 and the hub 30. The retaining ring 20 partially fits in groove 23 on the inside perimeter 24 of the disc 20. As shown in FIG. 3, the retaining ring 20 extends out from groove 23 and rests on top of the drive tangs 26, 33 covering and locking in the drive mechanism or coiled spring pins 60. The retaining ring 70 prevents axial movement between the disc 20 and the hub 30.

After assembly of the rotor 10, the cooling pockets 40 of the hub 30 are aligned with the cooling slots 42 of the disc 20. This allows air to flow throw the disc 20 and through the hub 30 to cool the center of the hub 30 and prevent high temperatures from cracking the hub 30 when the rotor 10 is in operation.

During operation of the rotor 10, a high amount of torque is applied to the rotor. The torque is applied to the coiled spring pins 60. The coiled spring pins 60 can take approximately a maximum of 212,000 psi before shearing.

After shearing of the drive pins, replacement coiled spring pins 60 would need to be installed in the assembly. With the two piece design, installing the replacement drive pins is more convenient and less labor intensive. The disc 20 is the only part that would need to be removed from the wheel hub. The hub 30 of the rotor will remain attached to the wheel hub. The rotor 10 with the disc 20 and hub 30 connected is very heavy for a commercial vehicle. By only having to remove the disc 20, which weighs less than the hub 30, for maintenance and repairs, allows for more efficiency by the mechanic. The drive pins are used as alignment devices which allows the rotor to be replaced without specialized removal of the hub from the vehicle.

Although the invention has been described in detail with reference to certain preferred embodiments thereof, other embodiments are possible. Therefore, the spirit and scope of the appended claims should not be limited to the description of the preferred embodiment contained herein.

The invention claimed is:

1. A rotor for a truck brake system comprising:
   a disc with an outside perimeter and an inside perimeter, a plurality of drive tangs being positioned around the inside perimeter, the ends of each of the disc drive tangs having semi-circular cavities; and
   a hub, which is a separate piece from said disc, including a plurality of drive tangs, the drive tangs of the disc fitting between and directly contacting respective ones of the drive tangs of the hub when the hub is connected to said disc, the ends of the hub drive tangs having semi-circular cavities, and the connection of the disc drive tangs with the hub drive tangs forming a complete circular cavity for housing respective driving mechanisms.

2. The rotor according to claim 1 wherein:
   said hub drive tangs are at opposite sides of said hub; and
   said disc drive tangs are at opposite sides of said disc.

3. The brake disc according to claim 2 wherein said drive tangs of said disc extend from the inside perimeter.

4. The rotor according to claim 1 wherein said drive mechanisms are spiral drive pins.

5. The rotor according to claim 1 wherein said drive mechanisms take up the tolerance in the connection of said disc and said hub for radial clamp force and for preventing rotational motion of said disc with respect to said hub.

6. The rotor according to claim 1 wherein said drive mechanisms are 180-degrees apart from each other.

7. The rotor according to claim 1 wherein said drive mechanisms absorb all torque applied to said rotor.

8. The rotor according to claim 1 wherein said disc comprises cooling slots for allowing air to pass through for cooling said hub and preventing high temperatures from cracking said hub.

9. The rotor according to claim 8 wherein said hub comprises said cooling pockets that align with said cooling slots of said disc when said disc and said hub are connected.

10. The rotor according to claim 1 further comprising a retaining ring which fits into a circumferential groove at said inside perimeter of said disc to take up any axial tolerances between said disc and said hub.

11. The rotor according to claim 1 wherein said hub comprises a mating flange for mating with a wheel hub.

12. The rotor according to claim 11 wherein said mating flange comprises scallops for attaching to rim of wheel hub.

13. A method of assembling a rotor on to a wheel hub of a vehicle comprising the steps of:
   connecting a hub to a wheel hub of a vehicle;
   connecting a disc to said hub by positioning drive tangs on the hub between drive tangs on the disc so that the drive tangs on the hub directly contact the drive tangs on the disc, and so that semi-circular cavities on the ends of the hub tangs interact with semi-circular cavities on the ends of the disc tangs to form complete circular cavities between the hub tangs and the disc tangs; and
   inserting drive mechanisms into the respective circular cavities for minimizing the tolerance between said hub and said disc and for absorbing the torque placed on said rotor.

14. The method according to claim 13 further including:
   fitting a retaining ring into a circumferential groove at an inside perimeter of said disc to take up axial tolerances between said disc and said hub.

* * * * *